United States Patent [19]

Maheux et al.

[11] 3,900,242

[45] Aug. 19, 1975

[54] ELECTRICAL CONNECTION OF FLEXIBLE PRINTED CIRCUITS

[75] Inventors: Peter Francis Maheux, Arnprior; Brian Matthew Deacon, Ottawa, both of Canada

[73] Assignee: Northern Electric Company Limited, Montreal, Canada

[22] Filed: July 17, 1974

[21] Appl. No.: 489,175

[52] U.S. Cl. .............................. 339/95 R; 339/95 R

[51] Int. Cl.$^2$ ........................................... H01R 13/38

[58] Field of Search ................................ 339/95–99

[56] References Cited

UNITED STATES PATENTS

| | | | |
|---|---|---|---|
| 3,365,695 | 1/1968 | Harvey et al. | 339/99 R |
| 3,853,382 | 12/1974 | Lazar | 339/95 R |

*Primary Examiner*—Joseph H. McGlynn
*Attorney, Agent, or Firm*—Sidney T. Jelly

[57] ABSTRACT

The invention is concerned with connecting flexible printed circuits. The circuits, with their electrically conducting surfaces in contact at the connecting position, are clamped between two members having opposed surfaces. The surface of one member is slightly out of parallelism with the surface of the other member. Pins project slightly through the surface of the one member, a pin for each pair of opposed conductors. As the clamping members are moved into final clamping relationship, the one member distorts and the pins are given a small rotational or swinging movement in a plane normal to the planes of the conductors. This causes a wiping action at the point of contact between conductor pairs.

3 Claims, 4 Drawing Figures

ELECTRICAL CONNECTION OF FLEXIBLE PRINTED CIRCUITS

This invention relates to the electrical connection of flexible printed circuit members, and is particularly, but not exclusively, concerned with connecting such members in telephone sets.

The use of flexible printed circuits is widespread, and such use is increasing. In telephone sets, both to offset increased labour and material costs and to reduce the volume occupied by the circuitry, mounting of miniature components, and complete sub-circuits, on flexible printed circuit members is becoming extremely attractive.

Various means have been developed for connecting one member to another, or a printed circuit to a supply line. It has been proposed to permanently attach the printed circuit to a connecting block so that conventional male and female pin and socket connections can be used. It has also been proposed to attach individual terminals to the individual conductors of the flexible printed circuit for connection of normal wires thereto.

The use of conventional connectors defeats to a greater or lesser extent the object of using a flexible circuit. Also, as the conductor on the printed circuit is a thin layer, plated or otherwise deposited on the flexible substrate, connection to these conductors can present a problem.

The present invention provides a system whereby two flexible printed circuits are directly connected together electrically, without any intervening parts, to give highly efficient connections, which connections can be readily broken and remade as required.

Broadly, the present invention provides for the electrical connection of two flexible circuits by clamping the circuits, with their conducting surfaces in contact, between two members, the two members having opposing cooperating surfaces, the surface of one member before clamping of the members being slightly out of parallelism with the cooperating surface of the other member. Projecting through the surface of the one member is a pin for each opposed pair of conductors. On final movement of the two clamping members into close relationship the one member distorts and the pins are given a small rotational or swinging movement in a plane normal to the planes of the conductors. By this means a wiping action occurs between conductors at connection.

The invention will be readily understood by the following description of one embodiment, by way of example, in conjunction with the accompanying drawings, in which.

Figures 1, 2, 3, 4:
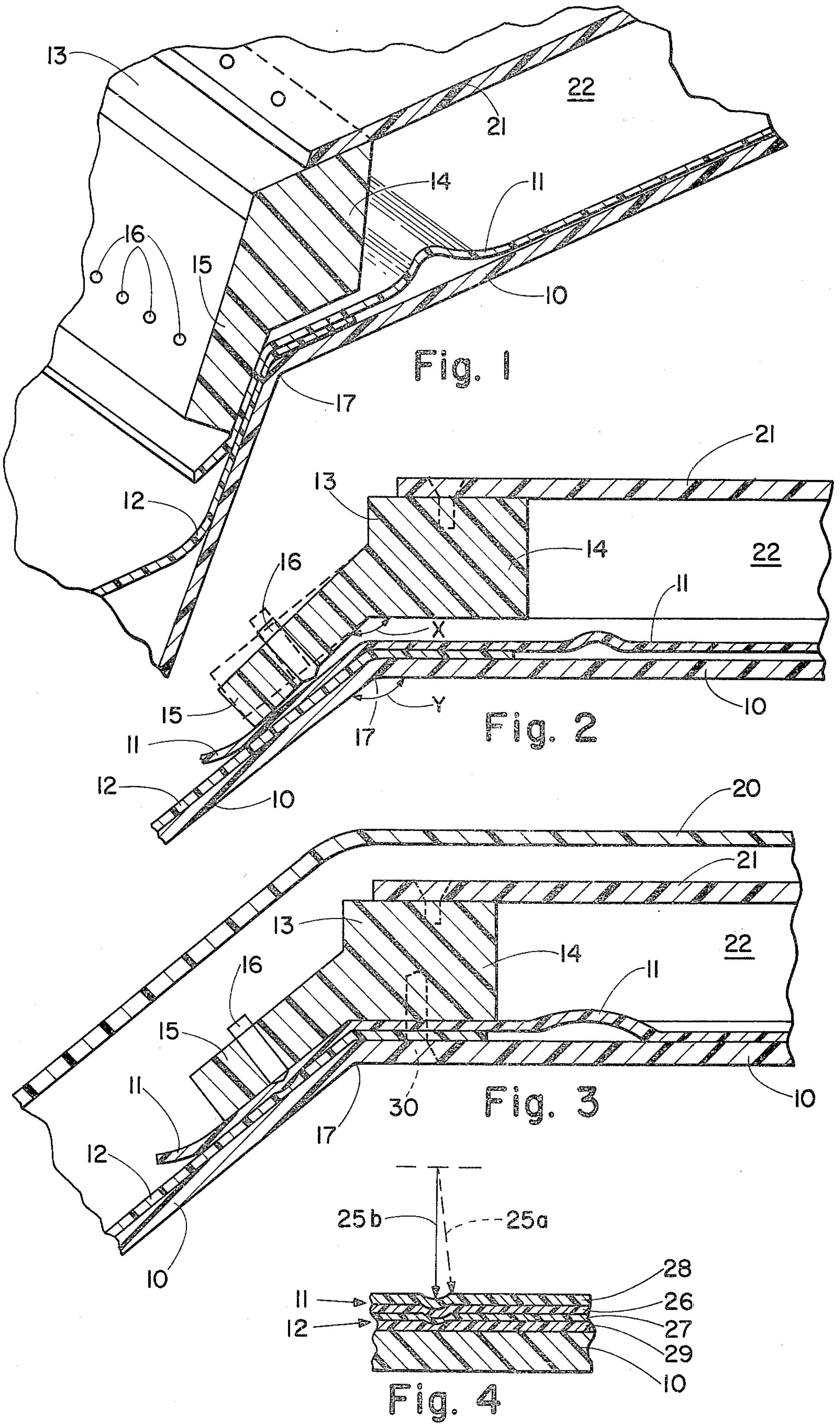
FIG. 1 is a perspective cross-sectional view of two connected flexible circuits.
FIG. 2 is a cross-section through an assembly, as in FIG. 1, just prior to moving the clamping members to their final position.
FIG. 3 is a cross-section as in FIG. 2 with the members in their final clamping position.
FIG. 4 is a diagrammatic cross-section through the two flexible circuits at the point of electrical connection, illustrating the principle of deformation and wiping action.

The example illustrated in FIGS. 1, 2 and 3 is of a telephone set, only part of which is shown. One part of the housing is at 10 and is of substantially rigid plastic molded construction. A first flexible printed circuit is indicated at 11, and this circuit may, for example, carry the components for any desired circuitry. A second flexible printed circuit is indicated at 12 and this circuit may, for example, be connected to the plug or other member to which the line cord is connected, and may also carry some components.

Indicated at 13 is a block having a main portion 14 and an extending web 15. The block 13 is of plastic material, molded or otherwise formed, and has a predetermined amount of flexibility. Thus, for example, the block can be of a nylon material and the web 15 can flex to a limited degree at its junctions with the main body portion 14. Extending through the web 15, near the edge remote from the junction with the main body portion 14, are a number of pins 16. These are seen clearly in FIG. 1. The individual conductors of the two flexible circuits 11 and 12 are prepositioned on the flexible substrates that on positioning the circuits in the telephone set the two sets of conductors are in opposing relationship. The conductors are of course arranged to be in opposition, that is the printed circuits are assembled so that the conductive layers are in contact. A pin 16 is provided for each pair of opposed conductors.

In FIG. 2 is illustrated the situation when the two printed circuits 11 and 12 are in position on the housing 10 and the block 13 is resting on the circuits. It will be seen that in the example illustrated, the housing 10 has a bend at 17 and one part of the housing extends at an angle to the other part. Similarly the web 15 extends at an angle to the main portion 14 of the block 13. The angle subtended by the surface of the web and the surface of the main body portion, indicated in FIG. 2 as "X" is slightly more acute than the angle subtended by the two surfaces of the housing 10, indicated in FIG. 2 as "Y". It will be seen that the pins 16 extend slightly from the surface of the web 15.

In FIG. 3 the block 13 is shown pushed down to clamp the two flexible printed circuits between block and housing. In being pushed down, the web 15 of necessity flexes at its junctions with the main body portion 14. This flexing is indicated in FIG. 2 by the dotted lines 18. Flexing of the web 15 causes a swinging of the pins 16 in a planenormal to the surface of the web 15 and to the plane of the junction between the two flexible circuits 11 and 12. This is indicated in FIG. 2 by the dotted lines 19. Also indicated in FIG. 3 is a part of a further housing part 20. In the present example the housing parts 10 and 20 form a housing for a telephone handset. A rigid printed circuit board 21 is attached to the body portion 14 of the block 13, and components can be mounted in the space 22. The two housing parts can be members of a telephone handset.

FIG. 4 illustrates diagrammatically the swinging action of pin 16. A pin is represented by an arrow 25, indicated in two positions 25*a* and 25*b*. The two flexible printed circuits 11 and 12 are shown, with the conductors 26 and 27 respectively in contact. The supporting substrates are seen at 28 and 29 respectively and the housing at 10. As block 13 is moved into clamping relationship the pin swings from a position corresponding to 25*a* to a position corresponding to 25*b*. As well as depressing the flexible circuit 11 to a certain extent, and also to a lesser extent the flexible circuit 12, the swinging of the pin causes a slight sliding of circuit 11 relative to circuit 12. This provides a wiping action at the point of contact between the conductors 26 and 27, giving a high efficiency connection with good electrical, and electronic, characteristics.

The connection can be broken as required, merely by unclamping, and then can be readily remade.

Although the example illustrated in FIGS. 1, 2 and 3 shows a housing having a bend over which fits a further member, i.e. block 13, also having a bend, it is possible to apply the principle of the invention to an arrangement in which one clamping member, for example the housing, is flat-presenting a flat surface. In this example the other member would have a surface to cooperate with the flat surface which is slightly concave. Thus the surface could be arcuate, of a fairly large radius, or otherwise curved, or could be composed of two surfaces almost in the same plane. The main requirement is that some flexing should occur on clamping, with a "swinging" movement of the pins to give a wiping action.

The term "flexible printed circuits" is intended to include both flexible circuits on which components are mounted, and circuits in which components are formed directly on the substrate, by electroplating or other methods. The term is also intended to include flexible cables, that is cables composed of printed or otherwise produced conductors on a flexible base, without components necessarily mounted thereon.

The size of connections, in accordance with the present invention is minimal. In many cases essential parts of the apparatus in which connections are to be made can be used as the clamping member. In the example illustrated, the block 13 and housing part 10 are urged into clamping relationship by screws 30 passing through holes in the housing part 10 and screwing into holes in the block 13. In other arrangements, not illustrated, the two clamping members can be urged into clamping relationship on assembly of the housing, for example by pressure pads formed on housing part 20.

What is claimed is:

1. A method of electrically connecting two flexible printed circuits, each circuit having at least one conductor thereon, comprising:

positioning the two circuits with the conductors in contact between two clamping members having opposing cooperating surfaces, the surface of one member being slightly out of parallelism with the surface of the other member;

positioning a pin to project through the said surface of the one member for each opposed pair of conductors in the flexible circuits;

and moving the clamping members into clamping relationship to distort said surface of said one member substantially into parallelism with the surface of said other member and swinging said pins in a plane normal to the planes of the conductors to urge said conductors into direct intimate connection and to cause a wiping motion between said conductors as the connection is made.

2. A method as claimed in claim 1, said surface of said one member of concave form and said surface of said other member of convex form, the surface of said one member having a slightly higher degree of concavity than the degree of convexity of the surface of said other member.

3. A method as claimed in claim 1, each of said surfaces composed of two substantially planar surfaces subtending an angle to each other, the angle subtended by the planar surfaces of said one member slightly smaller than the angle subtended by the planar surfaces of said other member.

* * * * *